G. KENNY.
Fifth Wheel.
No. 16,122.
Patented Nov. 25, 1856.
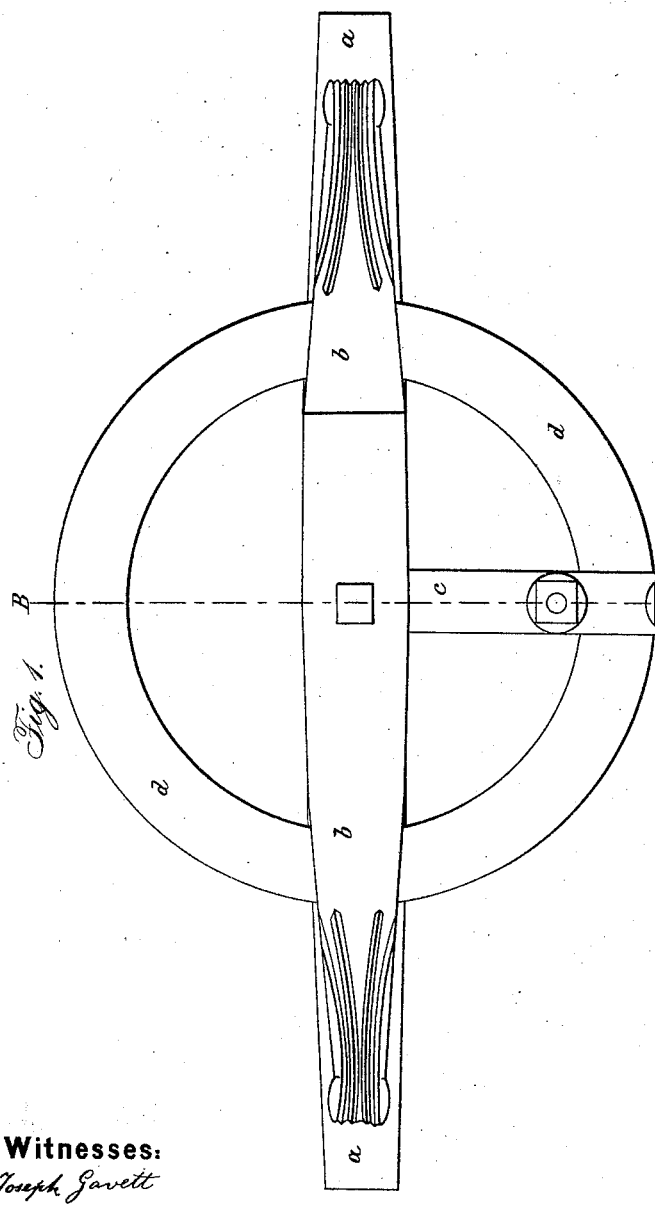
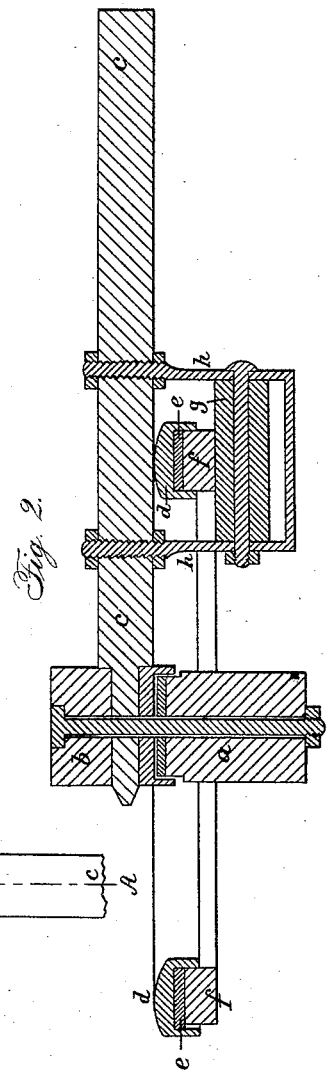
Witnesses:
Joseph Gavett
Samuel N. Piper
Inventor:
George Kenny

UNITED STATES PATENT OFFICE.

GEORGE KENNY, OF MILFORD, NEW HAMPSHIRE.

TURNING CIRCLES FOR CARRIAGES.

Specification of Letters Patent No. 16,122, dated November 25, 1856.

*To all whom it may concern:*

Be it known that I, GEORGE KENNY, of Milford, in the county of Hillsboro and State of New Hampshire, have invented certain new and useful Improvements in Turning Circles Used in Carriages, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a plan or top view of my improved turning circle. Fig. 2 is a vertical section of the same taken in the plane of the line A B Fig. 1.

The "turning circle" used in carriages usually consists of two flat circular plates, one of which is attached to the "head block" or "rocker shaft" and the other to the axle. The motion of the carriage and the horse is such as to constantly throw grit and dirt between the bearing surfaces of the plates, subjecting them to a grinding action, and thereby soon wearing them, so that repairs are constantly necessary, while the friction is so great as to prevent their turning easily.

My improvements consist in forming the circular plates in a base form, in such a manner as to effectually exclude all dirt, and also in combining with the said circles a friction roll of rubber or other elastic substance which forms a bearing for the lower plate of the circle and essentially diminishes the friction.

$a\ a$ in the drawings represents the axle of a carriage, $b\ b$ the rocker or head block, and $c\ c$ the perch. To the underside of the rocker and perch is attached a circular box $d\ d$, with a washer of leather $e\ e$, into which box an annular plate $f\ f$ attached to the axle $a\ a$ fits, as shown in Fig. 2, the box $d\ d$ fitting over the plate $f\ f$, and forming a close box joint, thereby excluding all dirt and grit and thus preventing the great friction and wear attendant upon the ordinary mode of construction. In order to still more diminish the friction the lower annular plate $f\ f$ bears upon a roll $g$ composed of rubber or other elastic material that has its bearings in a staple $h\ h$ attached to the perch $c\ c$. The friction roll $g$ keeps the annular plate $f\ f$ up to its proper bearings and materially lessens the friction of the play of said plate.

The advantages of these improvements will readily be appreciated by carriage manufacturers as the friction and wear of "turning circles" by the ordinary mode of construction are so great as to require constant attention and repairs.

The effect of inserting the leather washer $e,\ e$, between the bearing surfaces of the plate $f,\ f$, and box $d,\ d$, is such as to prevent the squeaking noise which usually occurs in turning circles, and which can be obviated only by oiling the said circles whereby they are soon worn out by the grinding of the surfaces occasioned by the action of the oil and grit. By inserting the leather washer composed of harness leather well saturated with oil, both the noise and the wear are prevented, as the box joint excludes the dirt and grit and the oiled washer lubricates the bearing surfaces. The jar also to the carriage occasioned by two metallic surfaces striking together is obviated by using the leather washer which receives all the jolts and causes the carriage to spring and ride much easier.

Having thus described my improvements I shall state my claims as follows:

What I claim as my invention and desire to have secured to me by Letters Patent is—

1. An annular box plate composed of two circles, one attached to the head block or rocker and the other to the axle and so constructed as to form a box for excluding dirt and grit from the bearing surfaces of the circular plates, in which box is inserted a washer of oiled leather, the box joint serving to exclude all dirt and grit from the bearing surfaces, and thereby preventing their rapid wear, and the leather washer preventing the squeaking noise and friction common to all other modes of connecting turning circles, and preventing the jar which would otherwise be occasioned by two metallic surfaces striking together as set forth.

2. I also claim combining with a "circle" a rubber or other elastic friction roll, upon which the said circle turns to lessen the friction and noise, and diminish the wear as set forth.

GEORGE KENNY.

Witnesses:
JOSEPH GAVETT,
SAMUEL N. PIPER.